Dec. 6, 1949     P. SCHLUMBOHM     2,490,379
MIXING DEVICE
Filed Oct. 30, 1945
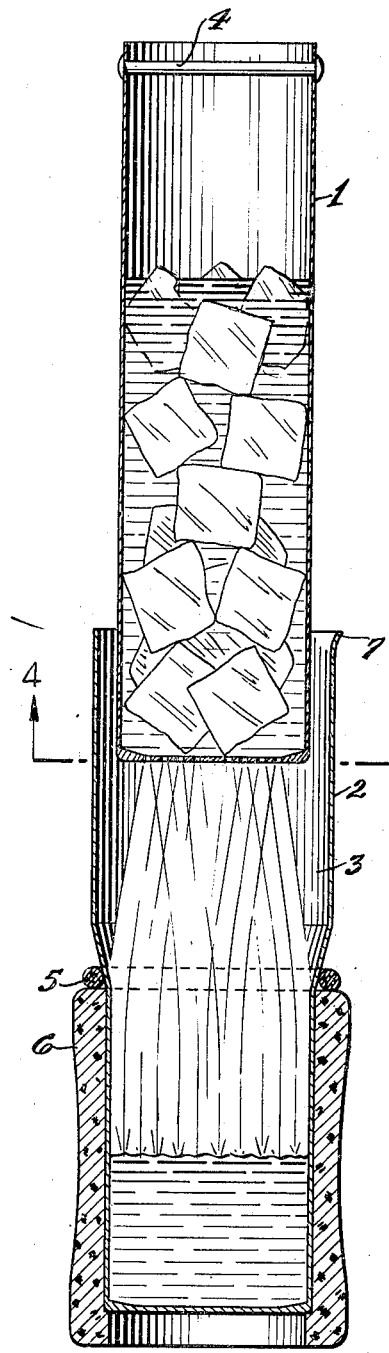
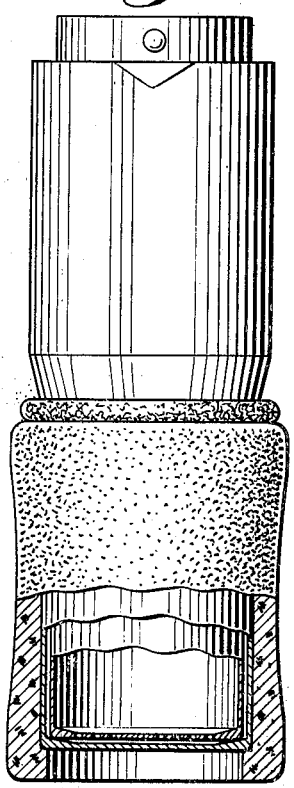
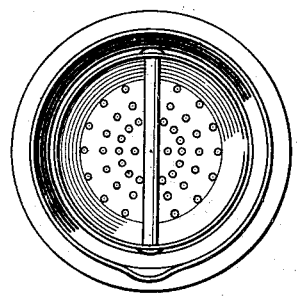
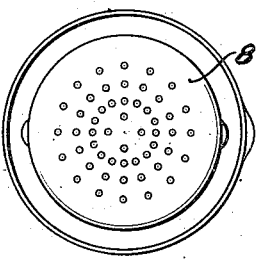
INVENTOR.

Patented Dec. 6, 1949

2,490,379

UNITED STATES PATENT OFFICE 2,490,379

MIXING DEVICE

Peter Schlumbohm, New York, N. Y.

Application October 30, 1945, Serial No. 625,525

3 Claims. (Cl. 62—149)

1

The invention relates to apparatus for improving the taste of cold liquids and for mixing liquids. More specifically, the invention aims at improving the taste of ice water and of cocktails.

The taste of water is influenced by three factors: the salt content, the temperature and the amount of air dissolved in the water. Inasmuch as the invention shall be applied to ordinary drinking water of a given salt content, and inasmuch as it is a general practice to improve such water in its palatability by cooling it by means of ice or other refrigeration means, the invention relates to the third factor and improves the taste of water by aeration. In this respect, the invention applies in general to beverages, with the exception of carbonated beverages.

The invention aims at aerating cooled water to the maximum, to the saturation point at that temperature of the water.

The aerating of water and such a saturation point are not exclusively guided by Henry's law (solubility of gases in liquids as function of the pressure), nor by the functional relation between solubility and the temperature of the liquid. Adsortion and occlusion phenomena play a great role, and efficient aeration must consider these surface effects and must provide a large surface of the liquid to be exposed to the air. At drink-water reservoirs, for instance in New York city, to this end the water is sprayed in a finely divided spray vertically up into the air.

Surprisingly enough, nobody has ever applied analogous procedure to ice water. People were already satisfied with the improvement of the taste of the water resulting from the lower temperature.

It is a fallacy to assume, that cold water, such as the ice water in an ice-pitcher, or the water drawn from the tap of an "ice water" system in hotel rooms, would automatically charge itself with air in dependency of the physical law that the colder the liquid the greater the amount of air dissolvable in it. It is the lack of surface exposure, which slows down the adjustment. In a pitcher the upper layer will be saturated, and this will slow down the further penetration of air into the main bulk of the water. One must keep in mind that this water contains only as much air as corresponded to the original warmer temperature of the water, prior to its being filled into the ice-filled pitcher.

Comparing the taste of such ice-water with the taste of water from a brook, which is much warmer than the iced water, but which is aerated to its saturation point, I realized that icing the

2 water is only half the job done. I invented the new apparatus as shown in Figures 1 to 4 of the accompanying drawings, so that the water should not only be iced but also well aerated, and I am proud to say, that I succeeded in improving the taste of ice water, giving it the live tang of water from a mountain brook.

Fig. 1 shows the apparatus in vertical section.

Fig. 2 shows Fig. 1, partly in view, partly in section.

Fig. 3 is a top view of Fig. 1.

Fig. 4 is a cross section along 4—4 of Fig. 1.

The new apparatus comprises two nested containers of nearly the same liquid capacity, and is characterized by a sieved bottom of the inner container. Ice and water, filled into the inner container while the containers are arranged nested, will be lifted with the lifting of the inner container—as illustrated in Fig. 1—and the cooled water will rain through the sieve bottom into the outer container. By lowering the inner container into the nested position, the water will re-enter the inner container's space through said sieve bottom, and the "rain" play may be repeated by lifting again the inner container. Obviously, during this rain phase, the water offers a large surface to the ambient atmosphere and can charge itself to saturation with air.

Utilizing the apparatus of the invention, a good rain effect is secured by two factors: A tubular shape of the inner container, so that the given amount of water will form a liquid column as high as possible, resulting in a favorable hydrostatic pressure of the water over the sieve. Second, the sieve should not be formed just by holes in a thin wall, but the openings should have the characteristics of a tubular channel. Each of these tubular channels should be at least as long as its inner diameter. In practice, this means, that if the diameter of the opening is $\frac{1}{16}$", the sieve wall should be at least $\frac{1}{16}$" thick. Such a sieve renders good hydrodynamic flow conditions for the water and results in a rain with optimal large water surface. Openings of $\frac{1}{16}$" are best.

As described so far, the outer container has only the function of a rain barrel. However, following the invention, an additional functional relation between the two containers is provided.

As shown in Figs. 1 and 2, the inner container 1 has a substantially cylindrical shape of even diameter throughout its entire length, while the outer container 2 has two sections of different diameter. As may be seen in Fig. 2, the inner diameter of the lower section of the outer container corresponds nearly to the outer diameter of the inner container. The inner container thus works as a plunger piston within a piston chamber, when lifted and lowered as described. The relatively small clearance between the "piston" and the "chamber" will make it possible to exercise pressure on the liquid in said chamber by lowering the piston into the chamber. Under this pressure the liquid will return through said sieve bottom of the "piston" faster into the inner container than it would without such pressure. Another effect of this pressure will be, that the liquid returns into the liquid already held in the inner container in the form of jets, resulting in a homogenizing, mixing effect. Under the same pressure, liquid shoots from the "chamber" into the upper space of the outer container. To break the momentum of such liquid, the upper space is in a zone of wider diameter than that of the chamber. This enlarged upper space also in general safeguards against overflow of liquid, when the level of the liquid is swaying up and down in the outer container when lifting and lowering the inner container.

In the example as illustrated in the drawings, a few details are shown, which may increase the practicality of the device, such as: a handle 4 for handling the inner container by the hand; a wool wick 5 to catch water condensed at the outer walls of container 2; a cork insulation jacket around the lower part of the outer container to protect the cooled and aerated liquid, which is stored in that part after the inner container with its surplus ice has been lifted out; and a pouring lip 7 for dispensing the liquid.

The drawings are half-scale of a device which was built following the invention, utilizing extruded aluminum cans for containers 1 and 2. The containers may also be made from plastics, china, glass, paper or other suitable material.

The size may range from the size of a drinking cup to the size of a large pitcher, still manageable by hand-lifting. If the lifting of the inner container 1 is done mechanically, there are no restrictions to size. However, if mechanical means are applied, more conventional spray equipment may serve the purpose equally well. The present apparatus is of special merit for hand operation and is as simple to handle as a tumbler.

Its simplicity is such that even the wellknown paper drinking cup as used in connection with water coolers may be redesigned to apply this invention. If in analogy to the drawings, the outer container 2 would be represented by the standard paper cup, all that is required is to provide a nesting second paper cup with a perforated bottom in analogy to container 1 and sieve bottom 8 of the drawings. A handle bar 4 would not be required. Such a paper cup would be sold with its insert. After having filled the unit in its nested position with iced water, the user would let the water rain a few times through the perforated bottom, as described above, by lifting the insert and lowering it repeatedly. The insert would then be thrown away to consume the drink as now is done from the paper cup. Inasmuch as most paper cups have a conical shape in their side walls, the insert container should also have the contours of a truncated cone, so as to nest easily into the outer paper cup. For reasons given above, such a paper cup apparatus would be inferior in its aerating effects to the special equipment shown in the drawings and described above.

What is said for improving the taste of ice water also applies analogously to improving the taste of cocktails. In this respect I wish to emphasize the additional effect of homogenizing and blending the various components of a cocktail, said effect being caused by the perforations through which the mixture is pumped back and forth.

Another additional advantage is the possibility to strain the cocktail free from ice, lemon seeds and pulp by simply lifting out the inner tube.

The present practice of shaking a cocktail with ice in a closed receptacle in to and fro kick fashion aims at three effects:

Cooling the liquid in heat exchange with the melting ice,

Homogenizing the liquid by blending the components, and

Aerating the cocktail by swirling it through the container.

In this latter respect, the effort is greatly counteracted by the partial vacuum which is created in the closed cocktailshaker by the first amount of air, which does get absorbed. In accordance with the Henry law, this lowering of the air pressure reduces the possibility of dissolving air.

Homogenizing by shaking the mass of liquid is not very efficient.

To shake all the ice to and fro is overdoing the job as actually required for the cooling effect.

Thus, the present standard practice of cocktailshaking is inferior to the apparatus of the present invention; not to speak of the leakage trouble and the straining difficulty of the old type, which is avoided in my invention.

Having disclosed the nature of my invention and having given an example for the manner in which it may be performed,

I claim as my invention:

1. A device of the class described, comprising an outer container having a lower portion of reduced width, an inner container having a width closely approximating but less than the reduced width of the inside of said outer container, said inner container having its bottom formed with perforations therethrough, an insulating member covering the side walls of said reduced portion of said outer member.

2. The structure recited in claim 1, wherein an annular wick extends about the top of said insulation.

3. A mixing device comprising a liquid container member having a section of reduced cross section, a plunger member, said plunger member being hollow and having a lower section with perforated walls, and fitting closely in said section of reduced cross section and adapted to be moved in and out through said section to pump liquid in the container through said perforations.

PETER SCHLUMBOHM.

REFERENCES CITED

The following references are of record in the file of this patent:

UNITED STATES PATENTS

| Number | Name | Date |
|---|---|---|
| 554,996 | Erlam | Feb. 18, 1895 |
| 1,213,342 | Duvall | Jan. 23, 1917 |
| 2,075,831 | Schlumbohm | Apr. 6, 1937 |